United States Patent
Asthana et al.

(10) Patent No.: US 12,229,511 B2
(45) Date of Patent: Feb. 18, 2025

(54) AUTOMATICALLY GENERATED QUESTION SUGGESTIONS

(71) Applicant: INTERNATIONAL BUSINESS MACHINES CORPORATION, Armonk, NY (US)

(72) Inventors: Ruchi Asthana, New York, NY (US); Steven Ware Jones, Astoria, NY (US); Jennifer A. Mallette, Vienna, VA (US); Jacob Lewis, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

(21) Appl. No.: 17/359,999

(22) Filed: Jun. 28, 2021

(65) Prior Publication Data
US 2022/0414331 A1  Dec. 29, 2022

(51) Int. Cl.
| | |
|---|---|
| *G06F 40/284* | (2020.01) |
| *G06F 40/186* | (2020.01) |
| *G06F 40/205* | (2020.01) |
| *G06F 40/35* | (2020.01) |
| *G06N 3/044* | (2023.01) |
| *G06N 3/0455* | (2023.01) |
| *G06N 3/08* | (2023.01) |

(52) U.S. Cl.
CPC .......... *G06F 40/284* (2020.01); *G06F 40/186* (2020.01); *G06F 40/205* (2020.01); *G06F 40/35* (2020.01); *G06N 3/044* (2023.01); *G06N 3/08* (2013.01); *G06N 3/0455* (2023.01)

(58) Field of Classification Search
None
See application file for complete search history.

(56) References Cited

U.S. PATENT DOCUMENTS

| 8,793,238 B1 | 7/2014 | Carver |
|---|---|---|
| 9,092,801 B2 | 7/2015 | Chang |
| (Continued) | | |

FOREIGN PATENT DOCUMENTS

| CA | 2633458 C | 6/2006 |
|---|---|---|
| WO | 2015037815 A1 | 3/2015 |

OTHER PUBLICATIONS

Samuel Thomas, Hong-Kwang J. Kuo, George Saon, Zoltan uske,Brian Kingsbury, Gakuto Kurata, Zvi Kons, Ron Hoory; RNN Transducer Models for Spoken Language Understanding; Apr. 8, 2021; URL: https://arxiv.org/pdf/2104.03842.pdf (Year: 2021).*

(Continued)

*Primary Examiner* — Richa Sonifrank
(74) *Attorney, Agent, or Firm* — Rakesh Roy

(57) ABSTRACT

A method, computer system, and a computer program product for automatically generated question suggestions is provided. The present invention may include generating an intent-entity sequence representative of a current chat conversation with a user. The present invention may also include predicting, using a trained intent-entity prediction model, a next intent-entity sequence based on the generated intent-entity sequence representative of the current chat conversation. The present invention may further include converting the predicted next intent-entity sequence into at least one likely question suggestion to return back to the user.

12 Claims, 10 Drawing Sheets

(56) References Cited

U.S. PATENT DOCUMENTS

| | | | |
|---|---|---|---|
| 11,032,217 B2* | 6/2021 | Liu | G06N 20/00 |
| 11,537,661 B2* | 12/2022 | Coope | G10L 15/063 |
| 11,537,877 B2* | 12/2022 | Goloubew | H04L 41/16 |
| 11,552,909 B2* | 1/2023 | Lopes de Moraes | G06F 11/3692 |
| 11,580,112 B2* | 2/2023 | Dua | G06F 16/243 |
| 11,676,067 B2* | 6/2023 | Kneller | G06F 40/35 706/12 |
| 11,704,898 B2* | 7/2023 | Jelveh | G06V 10/7784 382/159 |
| 11,823,082 B2* | 11/2023 | Koneru | H04L 51/02 |
| 2009/0055368 A1 | 2/2009 | Rewari | |
| 2011/0072338 A1* | 3/2011 | Caldwell | G06F 16/94 715/205 |
| 2013/0080362 A1 | 3/2013 | Chang | |
| 2014/0044243 A1 | 2/2014 | Monegan | |
| 2014/0317120 A1 | 10/2014 | Ghose | |
| 2016/0078456 A1 | 3/2016 | Chakraborty | |
| 2017/0024375 A1 | 1/2017 | Hakkani-Tur | |
| 2017/0094058 A1 | 3/2017 | Piaggio | |
| 2017/0242886 A1 | 8/2017 | Jolley | |
| 2017/0278514 A1* | 9/2017 | Mathias | G06F 16/35 |
| 2017/0351962 A1 | 12/2017 | Appel | |
| 2018/0144385 A1* | 5/2018 | Subramanya | G06N 3/08 |
| 2019/0012876 A1* | 1/2019 | Brahmandam | G07F 17/3234 |
| 2019/0103095 A1* | 4/2019 | Singaraju | G06F 16/35 |
| 2020/0005117 A1* | 1/2020 | Yuan | G06F 40/35 |
| 2020/0027064 A1* | 1/2020 | Mishra | G06F 16/9537 |
| 2020/0042642 A1* | 2/2020 | Bakis | G06F 40/35 |
| 2020/0090034 A1* | 3/2020 | Ramachandran | G06F 16/23 |
| 2020/0143115 A1* | 5/2020 | Brigham | G06N 3/006 |
| 2020/0177527 A1* | 6/2020 | Liu | H04L 51/216 |
| 2020/0387825 A1* | 12/2020 | Khan | G06F 16/3329 |
| 2021/0012245 A1* | 1/2021 | Singaraju | H04L 51/04 |
| 2021/0027770 A1* | 1/2021 | Olabiyi | G06N 3/045 |
| 2021/0090570 A1* | 3/2021 | Aharoni | G06F 40/30 |
| 2021/0125025 A1* | 4/2021 | Kuo | G06N 5/04 |
| 2021/0192134 A1* | 6/2021 | Yue | G06F 40/40 |
| 2021/0249001 A1* | 8/2021 | Cao | G10L 15/16 |
| 2021/0273959 A1* | 9/2021 | Salji | H04L 63/1433 |
| 2022/0229993 A1* | 7/2022 | Vu | G06F 40/295 |
| 2022/0414331 A1* | 12/2022 | Asthana | G06N 3/044 |
| 2022/0414741 A1* | 12/2022 | Ozcan | G06Q 30/0643 |
| 2024/0056403 A1* | 2/2024 | Yannam | H04L 51/02 |

OTHER PUBLICATIONS

Cai et al., An CNN-LSTM Attention Approach to Understanding User Query Intent from Online Health Communities, Nov. 2017, IEEE International Conference on Data Mining Workshops (ICDMW), 9 pages.

Dutta, Decoding Chatbots With IBM's Watson Assistant. Retrieved from Internet Jun. 16, 2019, 8 Pages, https://codeburst.io/decoding-chatbots-with-ibms-watson-assistant-d185d8403c3.

Mell et al., "The NIST Definition of Cloud Computing", Recommendations of the National Institute of Standards and Technology, NIST Special Publication 800-145, Sep. 2011, 7 pages.

Shalaby et al., Building Chatbots from Large scale Domain-specific Knowledge Bases: Challenges and Opportunities, Jun. 2020, 10 pages, 2020 IEEE International Conference on Prognostics and Health Management (ICPHM) (pp. 1-8). IEEE.

Singh, Chat Bots—Designing Intents and Entities for your NLP Models. Jan. 29, 2017, 7 pages, https://medium.com/@brijrajsingh/chat-bots-designing-intents-and-entities-for-your-nlp-models-35c385b7730d.

Velay et al., Seq2Seq and Multi-Task Learning for joint intent and content extraction for domain specific interpreters, Jul. 2018, 6 Pages, Artificial Intelligence Department of Lusis, Paris France.

Wang et al., Multi-turn Dialogue-oriented Pretrained Question Generation Model, Complex & Intelligent Systems, Feb. 2020, 13 Pages, https://doi.org/10.1007/s40747-020-00147-2.

Yang et al., Neural Matching Models for Question Retrieval and Next Question Prediction in Conversation, Jul. 17, 2017, 7 Pages, https://arxiv.org/pdf/1707.05409.pdf.

Asthana et al., "Intent-Based Question Suggestion Engine To Advance A Transaction Conducted Via A Chatbot" Application and Drawings, Filed on Sep. 27, 2019, 41 Pages, U.S. Appl. No. 16/586,801.

* cited by examiner

AUTOMATICALLY GENERATED QUESTION SUGGESTIONS

BACKGROUND

The present invention relates generally to the field of computing, and more particularly to conversational artificial intelligence (AI) technology.

AI-based technologies provide computer-implemented operations which can emulate certain human cognitive functions. In some instances, AI-based technologies enable interactions between users and computer systems using human natural language. Computer systems employing conversational AI, such as, for example, chatbots, often process large amounts of natural language data in order to extract meaning from what a user is saying. One goal of chatbots is to converse with users in a manner similar to human agents. However, building complicated guided-paths in the conversation that mimic human agent behavior may be cumbersome and may make the chatbot feel limited to a choose-your-own-adventure narrative versus a dynamic back-and-forth conversation.

SUMMARY

Embodiments of the present invention disclose a method, computer system, and a computer program product for automatically generated question suggestions. The present invention may include generating an intent-entity sequence representative of a current chat conversation with a user. The present invention may also include predicting, using a trained intent-entity prediction model, a next intent-entity sequence based on the generated intent-entity sequence representative of the current chat conversation. The present invention may further include converting the predicted next intent-entity sequence into at least one likely question suggestion to return back to the user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
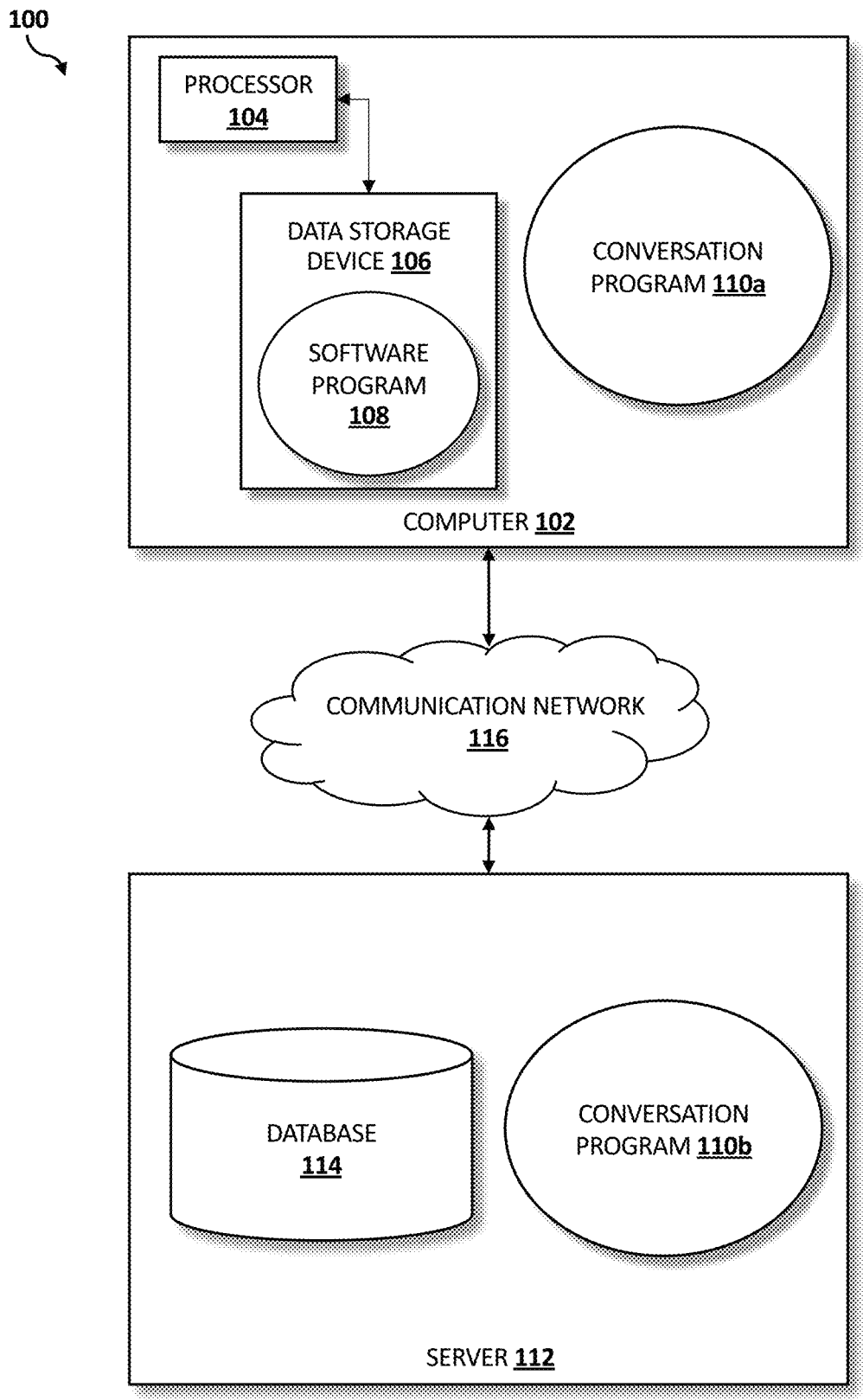
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for automatically generating specific question suggestions. As such, the present embodiment has the capacity to improve the technical field of conversational AI by using intent-entity sequences from past utterances to predict a user's next possible utterance (e.g., question). More specifically, a conversation program may include a training phase and a prediction phase. In the training phase, the conversation program may extract user (e.g., customer) utterances from historical chat conversations. Then, the conversation program may pass the customer utterances through a conversation parser which may include an intent classifier and an entity extractor. Next, the conversation parser may output an ordered sequence of intents and entities as they appear in the customer utterances. Thereafter, the conversation program 110a, 110b may train an intent-entity prediction model using the intent and entity sequences from each customer utterance. In the prediction phase, the conversation program may feed new customer utterances into the conversation parser to update an ordered sequence of intents and entities that may represent the conversation (thus far). Then, the conversation program may pass this updated ordered sequence through a trained intent-entity prediction model to generate predicted sequence of intents and entities most likely to appear next in conversation. Sequences with the highest confidence scores may then be fed into a next question generator by the conversation program. Thereafter, the next question generator may output specific, personalized questions to suggest back to the customer.

As described previously, AI-based technologies provide computer-implemented operations which can emulate certain human cognitive functions. In some instances, AI-based technologies enable interactions between users and computer systems using human natural language. Cognitive conversation systems may include AI-based software, such as, for example, chatbots, virtual assistants, and conversational agents. According to embodiments of the present disclosure, chatbots, virtual assistants, and conversational agents may include programs which recognize and understand the intent of a conversation input (e.g., utterance from a user) and may automatically generate an accurate conversation output (e.g., response) based at least on the recognized and understood intent. In some embodiments, conversation programs may additionally extract one or more entities (e.g., key words or phrases) from the conversation input in order to enhance the understanding of what the intent pertains to. For example, if the intent in a conversation input is to buy a product, the entity may be the name of the product referenced in the conversation input.

One goal of chatbots and other cognitive conversation systems is to converse with users in a manner similar to human agents. However, building complicated guided-paths in the conversation that mimic human agent behavior may be cumbersome and may make the chatbot feel limited to a choose-your-own-adventure narrative versus a dynamic back-and-forth conversation.

Therefore, it may be advantageous to, among other things, provide a way to predict and suggest a user's next possible utterance (e.g., question) in a conversation with a chatbot based on an ordered sequence of intents and entities from past utterances of the user. It may be advantageous to determine a user's intent to enable the conversation program to better predict the user's goal. It is contemplated that a next intent-entity sequence prediction model may provide a more accurate and thorough way to determine what the user will ask next. Further, a question generator may enable suggesting new utterances to the user to better help them to achieve their goal in the conversation.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a conversation program 110a. The networked computer environment 100 may also include a server 112 that is enabled to run a conversation program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 8, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the conversation program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the conversation program 110a, 110b (respectively) to automatically generate suggestions for a user's next utterance in a chat conversation with a human agent, a chatbot or other cognitive conversation system. The disclosed embodiments are explained in more detail below with respect to FIGS. 2 to 6.

Figure 2:
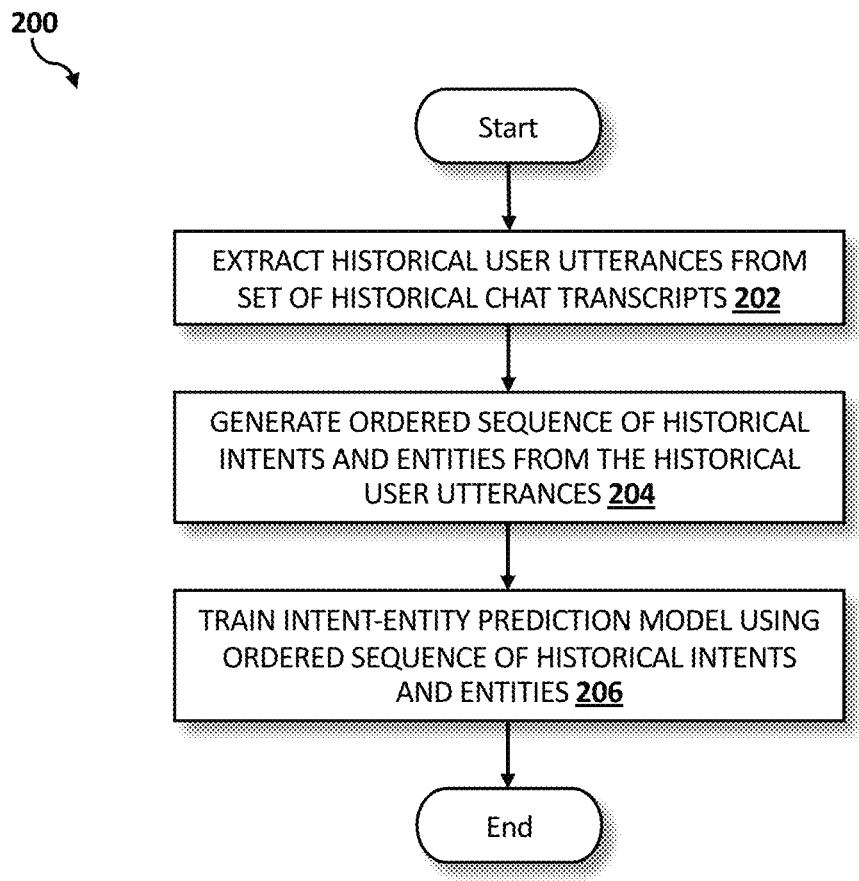
FIG. 2 is an operational flowchart illustrating a process for model training according to at least one embodiment.

Referring now to FIG. 2, an operational flowchart illustrating an exemplary model training process 200 used by the conversation program 110a and 110b according to at least one embodiment is depicted.

At 202, user utterances are extracted from a set of historical chat transcripts, as will be further detailed with reference to FIG. 3. Then at 204, an ordered sequence of intents and entities are generated from the user utterances, as will be further detailed with reference to FIG. 3. Thereafter, at 206, an intent-entity prediction model is trained user the ordered sequence of intents and entities, as will be further detailed with reference to FIG. 3.

Figure 3:
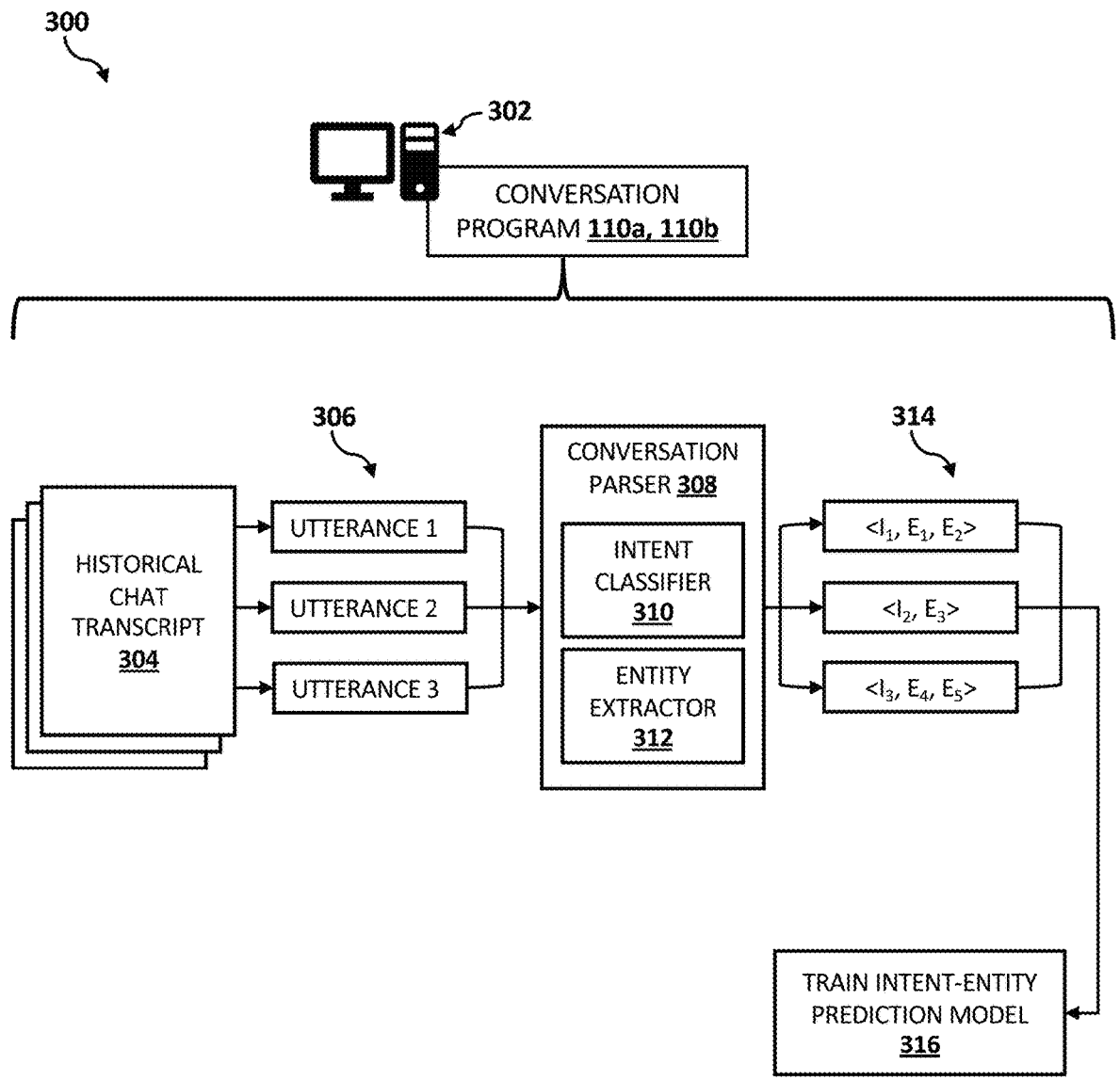
FIG. 3 is schematic block diagram of a model training environment according to at least one embodiment.

Referring now to FIG. 3, a schematic block diagram of a model training environment 300 implementing the model training process 200 of the conversation program 110a, 110b according to at least one embodiment is depicted. According to one embodiment, the model training environment 300 may include one or more components (e.g., client computer 102; server computer 112; communication network 116) of the computer environment 100 discussed above with reference to FIG. 1.

According to one embodiment, the model training environment 300 may include a computer system 302 having a tangible storage device and a processor that is enabled to run the conversation program 110a, 110b. In one embodiment, the computer system 302 may include one or more client computers 102 and/or one or more server computers 112. In various embodiments, the client computer 102 and/or the server computer 112 of the computer system 302 may include a workstation, a personal computing device, a laptop computer, a desktop computer, a thin-client terminal, a tablet computer, a smartphone, a smart watch or other smart wearable device, or other electronic devices.

In one embodiment, the conversation program 110a, 110b may include a single computer program or multiple program modules or sets of instructions being executed by the processor of the computer system 302. The conversation program 110a, 110b may include routines, objects, components, units, logic, data structures, and actions that may perform particular tasks or implement particular abstract data types. The conversation program 110a, 110b may be practiced in distributed cloud computing environments where tasks may be performed by remote processing devices which may be linked through the communication network 116. In one embodiment, the conversation program 110a, 110b may include program instructions that may be collectively stored on one or more computer-readable storage media.

According to one embodiment, the model training environment 300 may include a corpus of historical chat transcripts 304. In one embodiment, the historical chat transcripts 304 (e.g., provide as comma-separate value (CSV) files) may include one or more example user (e.g., customer) utterances (e.g., questions, statements) and human agent responses from past live-person chat conversations. In one embodiment, the conversation program 110a, 110b may parse the historical chat transcripts 304 and extract a set of historical user utterances 306. In one embodiment, the set of historical user utterances 306 extracted from the historical chat transcripts 304 may be represented as an ordered vector of historical user utterances (HU), where:

Historical Conversation=<$HU_1, HU_2, HU_3, \ldots, HU_n$>.

According to one embodiment, the conversation program 110a, 110b may include a conversation parser 308 comprising an intent classifier 310 and an entity extractor 312. In one embodiment, the conversation parser 308 may receive and process the set of historical user utterances 306 using the intent classifier 310 and the entity extractor 312.

In at least one embodiment, the conversation parser 308 may implement a natural language classifier, such as, for example, the intent classifier 310, to extract and classify an intent (e.g., expressed goal or purpose) of each of the set of historical user utterances 306. In one embodiment, the intent classifier 310 may include a multi-class intent classifier (e.g., k-nearest-neighbors (kNN), decision trees) configured to classify a piece of text as one of N intents. In at least one embodiment, the intent classifier 310 may be pre-trained on curated chat data.

In at least one embodiment, the conversation parser 308 may implement the entity extractor 312 to identify and classify named entities in each of the set of historical user utterances 306 into pre-defined categories (e.g., names of people and organizations, geographic locations, time expressions, product names, dates, quantities, events). In one embodiment, the entities extracted from the set of historical user utterances 306 may be represented as type-value pairs.

According to one embodiment, the output of the conversation parser 308 may include an ordered sequence of historical intents and entities 314. In one embodiment, each of the sequence of intents and entities may include an intent (I) that may be associated with one or more entities (E) (e.g., <$I_1, E_1, E_2$>). According to one embodiment, the ordered sequence of historical intents and entities 314 may be organized in a sequence corresponding to a sequence of the set of historical user utterances 306.

According to one embodiment, the conversation program 110a, 110b may then train an intent-entity prediction model 316 using the ordered sequence of historical intents and entities 314 as training data. In one embodiment, the conversation program 110a, 110b may train the intent-entity prediction model 316 to predict next intent-entity sequences as will be detailed further with reference to FIGS. 4 to 6.

Figure 4:
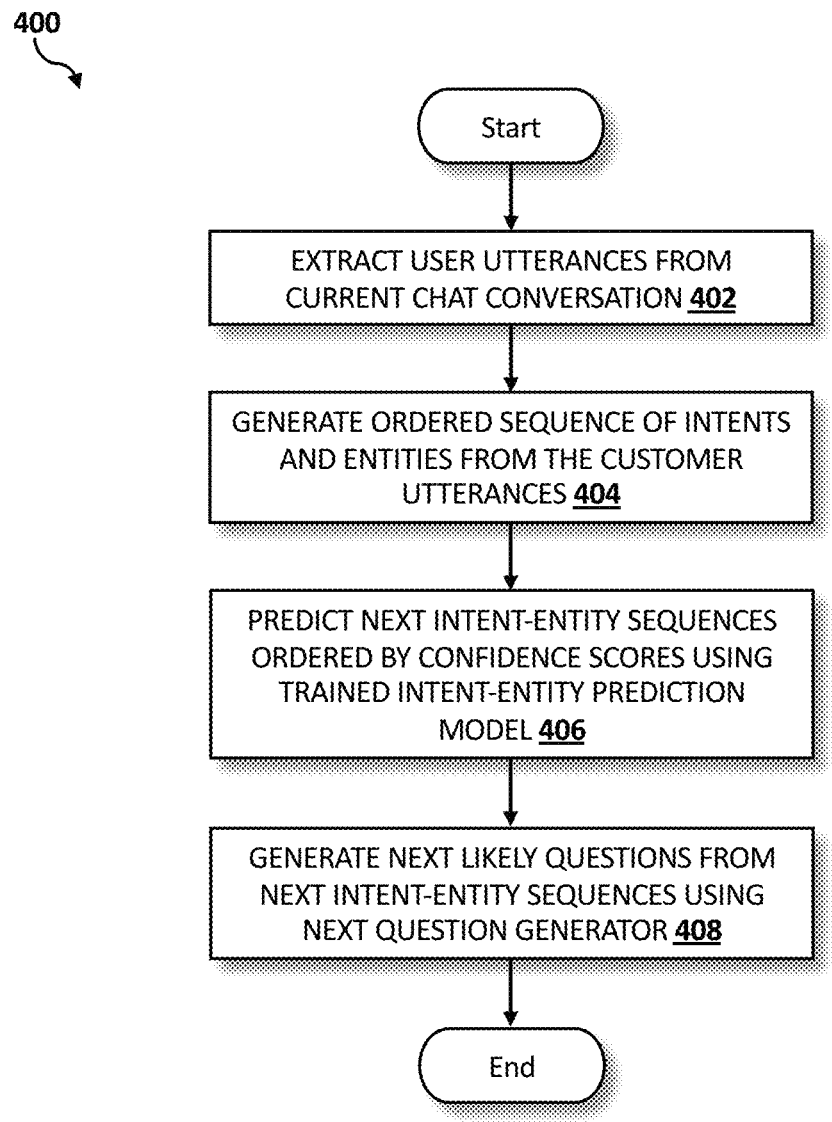
FIG. 4 is an operational flowchart illustrating a process for model prediction according to at least one embodiment.

Referring now to FIG. 4, an operational flowchart illustrating an exemplary model prediction process 400 used by the conversation program 110a and 110b according to at least one embodiment is depicted.

At 402, user utterances are extracted from a current chat conversation, as will be further detailed with reference to FIG. 5. Then at 404, an ordered sequence of intents and entities are generated from the user utterances, as will be further detailed with reference to FIG. 5. Then at 406, one or more next intent-entity sequences are predicted and ordered by confidence scores using a trained intent-entity prediction model, as will be further detailed with reference to FIG. 5. Thereafter at 408, one or more next likely questions are generated from next intent-entity sequences using a next question generator, as will be further detailed with reference to FIG. 5.

Figure 5:
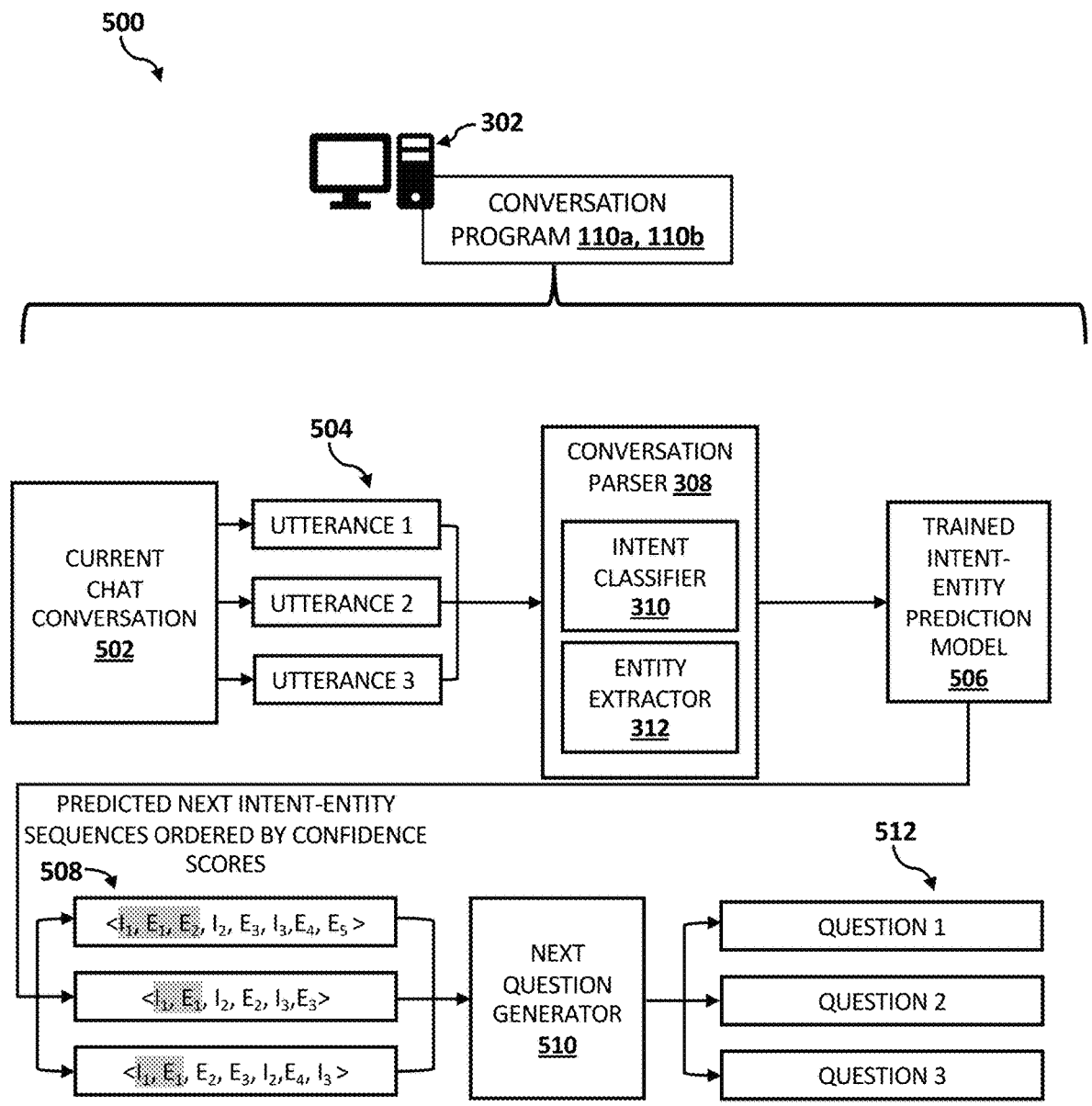
FIG. 5 is schematic block diagram of a model prediction environment according to at least one embodiment.

Referring now to FIG. 5, a schematic block diagram of a model prediction environment 500 implementing the model prediction process 400 of the conversation program 110a, 110b according to at least one embodiment is depicted. According to one embodiment, the model prediction environment 500 may include one or more components (e.g., client computer 102; server computer 112; communication network 116) of the computer environment 100 discussed above with reference to FIG. 1 and one or more components of the model training environment 300 discussed above with reference to FIG. 3.

According to one embodiment, the model prediction environment 500 may include a current chat conversation 502. In one embodiment, the current chat conversation 502 may include a new conversation (e.g., previously unseen) between a user (e.g., customer) and a chatbot.

In one embodiment, the current chat conversation 502 (e.g., provide as comma-separate value (CSV) files) may include one or more user utterances (e.g., questions) and chatbot responses. In one embodiment, the conversation program 110a, 110b may parse the current chat conversation 502 and extract a set of current user utterances 504. In one embodiment, the set of current user utterances 504 extracted from the current chat conversation 502 may be represented as an ordered vector of current user utterances (CU), where:

Current Conversation=<$CU_1, CU_2, CU_3, \ldots, CU_n$>.

According to one embodiment, the conversation program 110a, 110b may include conversation parser 308 comprising the intent classifier 310 and the entity extractor 312, as described previously with reference to FIG. 3. In one embodiment, the conversation parser 308 may receive and process the set of current user utterances 504 (e.g., current conversation vector) using the intent classifier 310 and the entity extractor 312, in a manner similar to that described previously with reference to FIG. 3.

According to one embodiment, the conversation program 110a, 110b may then pass the output of the conversation parser 308 (e.g., ordered sequence of intents and entities) to a trained intent-entity prediction model 506, as will be further detailed below. In one embodiment, the trained intent-entity prediction model 506 may output a prediction including a set of next intent-entity sequences 508. In at least one embodiment, the set of next intent-entity sequences 508 may be ordered (e.g., sorted, organized) based on confidence scores. According to one embodiment, the conversation program 110a, 110b may include a next question generator 510, as will be further detailed with reference to FIG. 6. In one embodiment, the next question generator 510 may receive the set of next intent-entity sequences 508 predicted by the trained intent-entity prediction model 506. In at least one embodiment, the next question generator 510 may generate (e.g., output) a set of next likely questions 512 which may be suggested to the user, as will be further detailed with reference to FIG. 6.

According to one embodiment the trained intent-entity prediction model 506 may include a sequence to sequence (seq2seq) model (e.g., deep learning technique that may implemented on sequence data). In one embodiment, the seq2seq model may include an encoder-decoder architecture. In another embodiment, the seq2seq model may include a recurrent neural network (RNN) architecture, as will be detailed with reference to FIG. 6.

In embodiments in which the trained intent-entity prediction model 506 may include an encoder-decoder based seq2seq model, the trained intent-entity prediction model 506 may ingest as input, the ordered sequence of intents and entities (e.g., set of next intent-entity sequences 508) of a fixed length. As described previously, the ordered sequence of intents and entities may represent the intent of the user utterance and the keywords (e.g., entities) found in the user utterance. In one embodiment, the output of the trained intent-entity prediction model 506 may include the set of next intent-entity sequences 508 ordered by the confidence that they will occur next in the current conversation. In one embodiment, the conversation program 110a, 110b may then filter out all of the output sequences in the set of next intent-entity sequences 508 which do not start with an intent. Next, the conversation program 110a, 110b may select the output sequences in the set of next intent-entity sequences 508 with the highest probability (e.g., confidence that they will occur next in the current conversation) as inputs for the next question generator 510.

Figure 6:
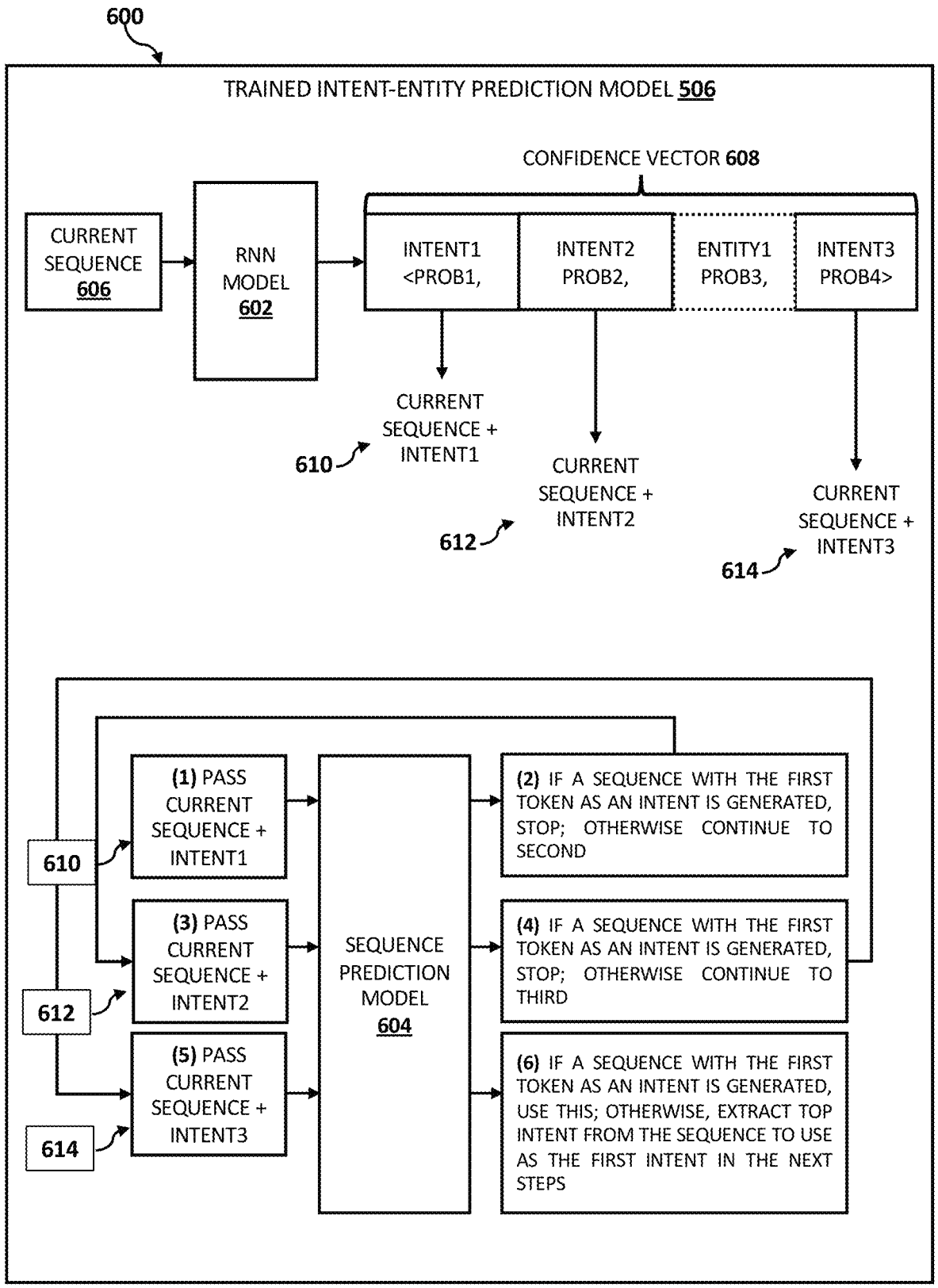
FIG. 6 is schematic block diagram of a recurrent neural network environment according to at least one embodiment.

Referring now to FIG. 6, a schematic block diagram of an RNN environment 600 of the conversation program 110a, 110b according to at least one embodiment is depicted.

In embodiments in which the trained intent-entity prediction model 506 may be implemented as an RNN based seq2seq model, the trained intent-entity prediction model 506 may include an RNN model component 602 and a sequence prediction model component 604.

According to one embodiment, the RNN model component 602 may ingest as input, a current sequence 606 (e.g., ordered sequence of intents and entities). In one embodiment, the output of the RNN model component 602 may include a confidence vector 608 across the vocabulary of intents and entities (e.g., every intent and entity in the dataset). In one embodiment, the confidence vector may indicate the probability that each intent/entity will be output next, based on the training data.

In one embodiment, the conversation program 110a, 110b may select the three highest confidence intent tokens (e.g., the specified intent in a sequence or predicted to be in the sequence) from the confidence vector 608 as the next predicted intent. Then, the conversation program 110a, 110b may append each of the three predicted intent tokens as a final token of an existing intent-entity sequence (e.g., the sequence of intents and entities that have seen in the conversation so far; current sequence 606) to create three hypothetical intent-entity sequences with different last intent tokens (e.g., including first sequence 610; second sequence 612; third sequence 614).

Next, the conversation program 110a, 110b may pass each of the three hypothetical intent-entity sequences (e.g., first sequence 610; second sequence 612; third sequence 614) into the sequence prediction model component 604 of the trained intent-entity prediction model 506 to generate predicted intent-entity tokens. In one embodiment, the conversation program 110a, 110b may implement the sequence prediction model component 604 to generate next tokens until either an intent is generated, or three entities have been generated.

For example, at event 1, the conversation program 110a, 110b may feed the sequence prediction model component 604 with the first sequence 610 (e.g., current sequence+intent1).

At event 2, if the sequence prediction model component 604 outputs a sequence having an intent as its first token (e.g., first output sequence $<I_1, E_1>$), the conversation program 110a, 110b may use that output intent-entity sequence as an input for the next question generator 510. Otherwise (e.g., first output sequence $<E_1, I_1>$), the conversation program 110a, 110b may continue to event 3 and feed the sequence prediction model component 604 with the second sequence 612 (e.g., current sequence+intent2).

At event 4, if the sequence prediction model component 604 outputs a sequence having an intent as its first token (e.g., second output sequence $<I_2, E_2>$), the conversation program 110a, 110b may use that output intent-entity sequence as an input for the next question generator 510. Otherwise (e.g., second output sequence $<E_2, I_2>$), the conversation program 110a, 110b may continue to event 5 and feed the sequence prediction model component 604 with the third sequence 614 (e.g., current sequence+intent3).

At event 6, if the sequence prediction model component 604 outputs a sequence having an intent as its first token (e.g., third output sequence $<I_3, E_3>$), the conversation program 110a, 110b may use that output intent-entity sequence as an input for the next question generator 510. Otherwise (e.g., third output sequence $<E_3, I_3>$), the conversation program 110a, 110b may extract the top intents (e.g., $<I_1, I_2, I_3>$) from each of the first (e.g., $<E_1, I_1>$), second (e.g., $<E_2, I_2>$), and third (e.g., $<E_3, I_3>$) output sequences to use as the first intents in the next output intent-entity sequences (e.g., $<I_1, E_1, I_2, E_2, I_3, E_3>$). Thereafter, the conversation program 110a, 110b may pass the output intent-entity sequences (e.g., $<I_1, E_1, I_2, E_2, I_3, E_3>$) as inputs for the next question generator 510.

Figure 7:
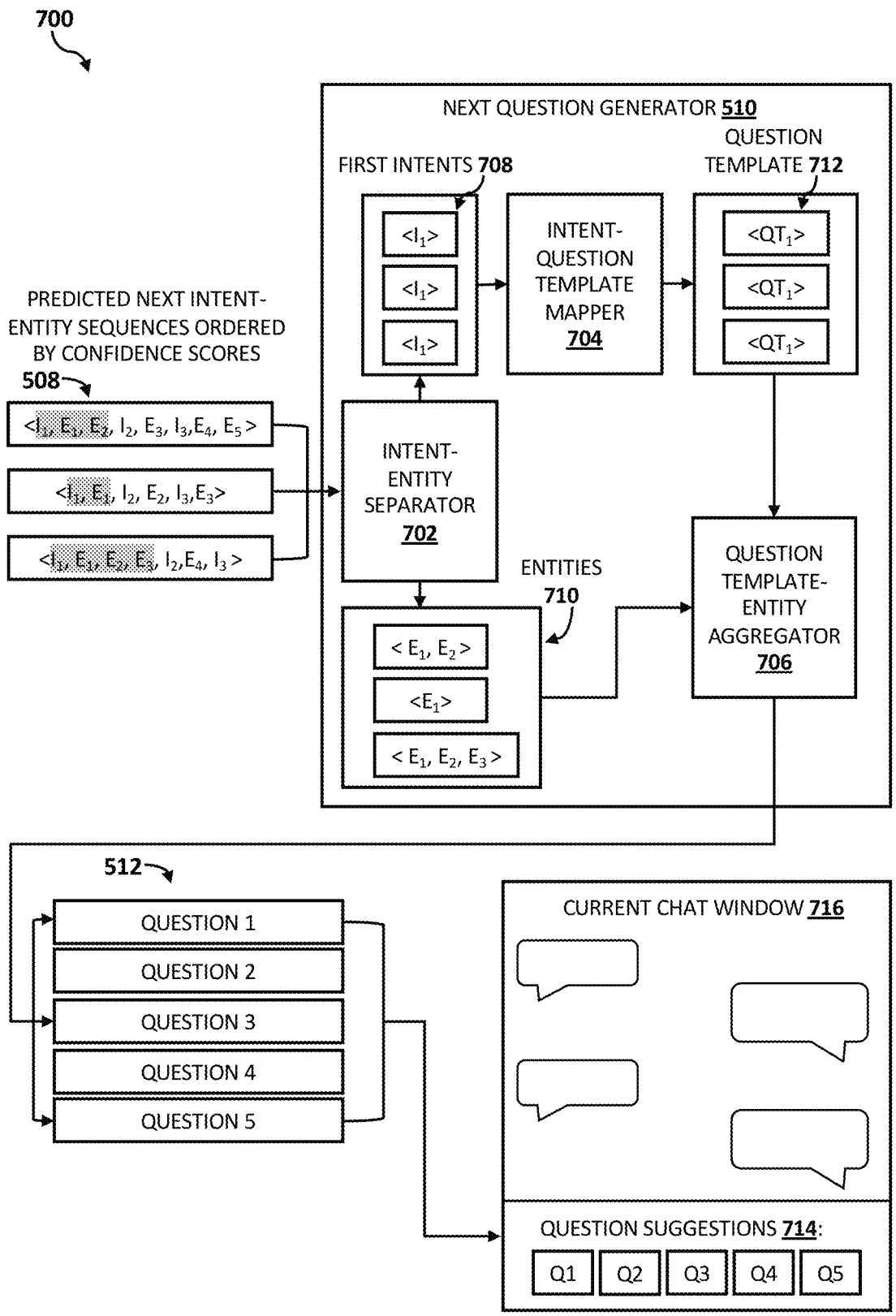
FIG. 7 is schematic block diagram of a next question generation environment according to at least one embodiment.

Referring now to FIG. 7, a schematic block diagram of a next question generation environment 700 implementing the model prediction process 400 of the conversation program 110a, 110b according to at least one embodiment is depicted. According to one embodiment, the next question generation environment 700 may include one or more components (e.g., client computer 102; server computer 112; communication network 116) of the computer environment 100 discussed above with reference to FIG. 1, one or more components of the model training environment 300 discussed above with reference to FIG. 3, one or more components of the model prediction environment 500 discussed above with reference to FIG. 5, and one or more components of the RNN environment 600 discussed above with reference to FIG. 6.

According to one embodiment, the next question generator 510 may include an intent-entity separator 702, an intent-question template mapper 704, and a question template-entity aggregator 706. In one embodiment, the next question generator 510 may receive the set of next intent-entity sequences 508 (e.g., the predicted next intent-entity sequences ordered by confidence scores) and may implement the intent-entity separator 702 to separate the intents and entities from each of the set of next intent-entity sequences 508.

According to one embodiment, the intent-entity separator 702 may output a set of first intents 708 from the predicted intent-entity sequences (e.g., set of next intent-entity sequences 508) and a set of entities 710 associated with the set of first intents 708 from the predicted intent-entity sequences. According to one embodiment, the next question generator 510 may then implement the intent-question template mapper 704 to map the set of first intents 708 to a set of question templates 712 such that each of the first intents may include a corresponding question template. According to one embodiment, the next question generator 510 may then implement the question template-entity aggregator 706 to insert entities from the set of entities 710 into the question templates 712 based on entity types. It is contemplated that each of the question templates 712 may indicate one or more entity types. As such, the question template-entity aggregator 706 may first filter a list of question templates such that the entity types in the question templates may be relevant to or match the entity types in the set of entities 710. In one embodiment, the question template-entity aggregator 706 may then select the question template which has the highest number of entities to fill in. According to one embodiment, the question template-entity aggregator 706 may output a set of next likely questions 512 incorporating the predicted next intent-entity sequence. In one embodiment, the conversation program 110a, 110b may display one or more question suggestions 714 (e.g., in a question suggestion portion of a chat window) in a current chat window 716 corresponding to the user's current chat conversation 502 (FIG. 5). In one embodiment, the conversation program 110a, 110b may insert the set of next likely questions 512 into the question suggestions 714 portion of the current chat window 716 as selectable questions by the user.

For example, the next intent-entity sequence 508 predicted by the trained intent-entity prediction model 506 may include the following predicted intent and entities: Intent (Buy); Entities (Version: Gold Version, Base Version, Premium Version). In one embodiment, the predicted intent and entities may be separated by the intent-entity separator 702, as previously described above. Continuing with the example, the intent-question template mapper 704 may map the "buy" intent to the following question templates: "I am interested in buying"; "I am interested in buying <version>"; and "I am interested in buying <product> <version> <edition>." The question template-entity aggregator 706 may then select the question template: "I am interested in buying <version>" since it includes the relevant entity type "version." Thereafter, the question template-entity aggregator 706 may insert each of the entities into the question template. In this example, the question template-entity aggregator 706 may output the following questions (e.g., set of next likely questions 512) based on the question template and entities: "I am interested in buying gold version"; "I am interested in buying base version"; and "I am interested in buying premium version." The conversation program 110a, 110b may then insert the set of next likely questions 512 above into the question suggestions 714 portion of the current chat window 716 as selectable questions by the user. According to one embodiment, the question template may include a statement (e.g., "I am interested in buying <version>"), rather than a question, as described in the above example. Notwithstanding, it is contemplated that the suggestions (e.g., questions or statements) provided to the user may be configured to advance the conversation towards the goal of the conversation.

In another example, the next intent-entity sequence 508 predicted by the trained intent-entity prediction model 506 may include the following predicted intent and entities: Intent (Use Case); Entities (Industry: finance, health care, government). In one embodiment, the predicted intent and entities may be separated by the intent-entity separator 702, as previously described above. Continuing with the example, the intent-question template mapper 704 may map the "use case" intent to the following question template: "How is product used in <industry>." Thereafter, the question template-entity aggregator 706 may insert each of the entities into the question template. In this example, the question template-entity aggregator 706 may output the following questions (e.g., set of next likely questions 512) based on the question template and entities: "How is product used in finance"; "How is product used in health care"; and "how is product used in government." The conversation program 110a, 110b may then insert the set of next likely questions 512 above into the question suggestions 714 portion of the current chat window 716 as selectable questions by the user.

The functionality of a computer may be improved by the conversation program 110a, 110b because the conversation program 110a, 110b may enable to computer to parse a current chat conversation and generate intent-entity sequences representative of the current chat conversation. The conversation program 110a, 110b may also enable the computer to train and implement an intent-entity prediction model which may take as input, the intent-entity sequences representative of the current chat conversation and may output a next intent-entity sequence prediction. The conversation program 110a, 110b may also enable the computer to implement a next question generator which may take as input, the next intent-entity sequence prediction, and generate personalized question or statement suggestions to return back to the user to further the current chat conversation.

It may be appreciated that FIGS. 2 to 7 provide only an illustration of one embodiment and do not imply any limitations with regard to how different embodiments may be implemented. Many modifications to the depicted embodiment(s) may be made based on design and implementation requirements.

Figure 8:
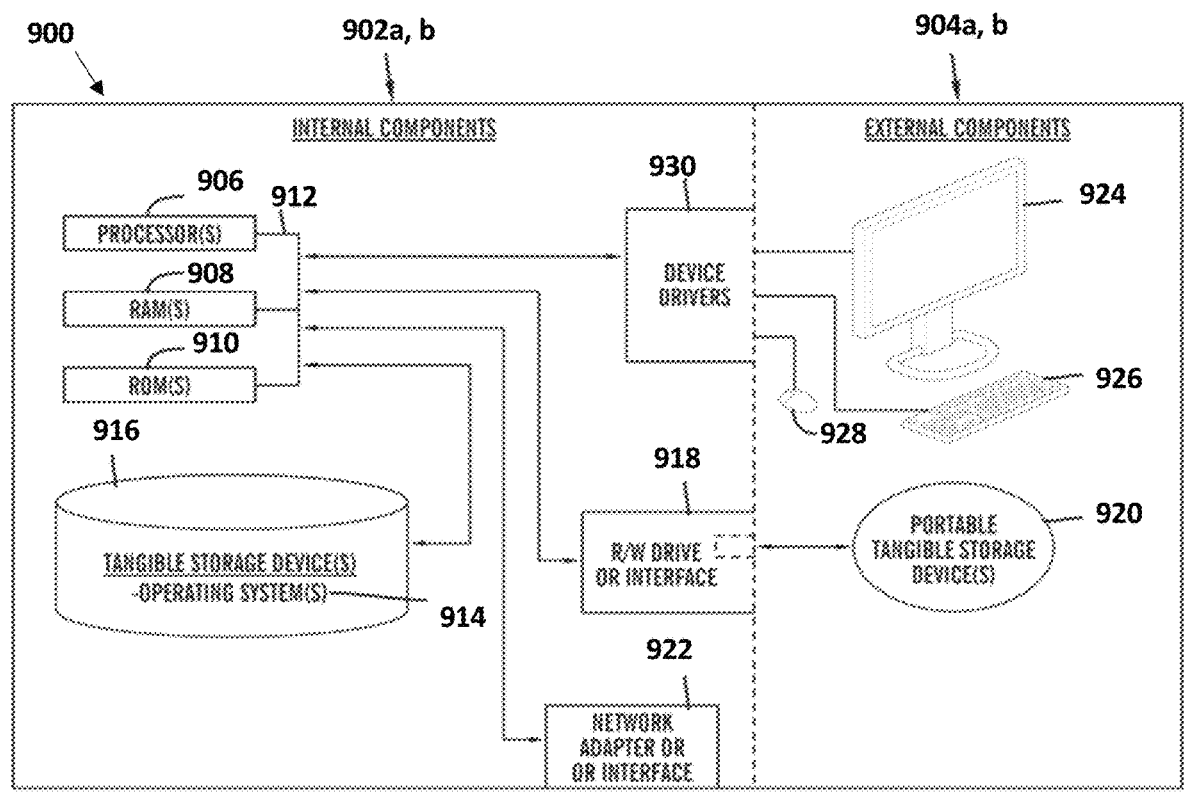
FIG. 8 is a block diagram of internal and external components of computers and servers depicted in FIG. 1 according to at least one embodiment.

FIG. 8 is a block diagram 900 of internal and external components of computers depicted in FIG. 1 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 8. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the conversation program 110a in client computer 102, and the conversation program 110b in network server 112, may be stored on one or more computer-readable tangible storage devices 916 for execution by one or more processors 906 via one or more RAMs 908 (which typically include cache memory). In the embodiment illustrated in FIG. 8, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices

920 such as a CD-ROM, DVD, memory stick, magnetic tape, magnetic disk, optical disk or semiconductor storage device. A software program, such as the software program 108 and the conversation program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the conversation program 110a in client computer 102 and the conversation program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the conversation program 110a in client computer 102 and the conversation program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
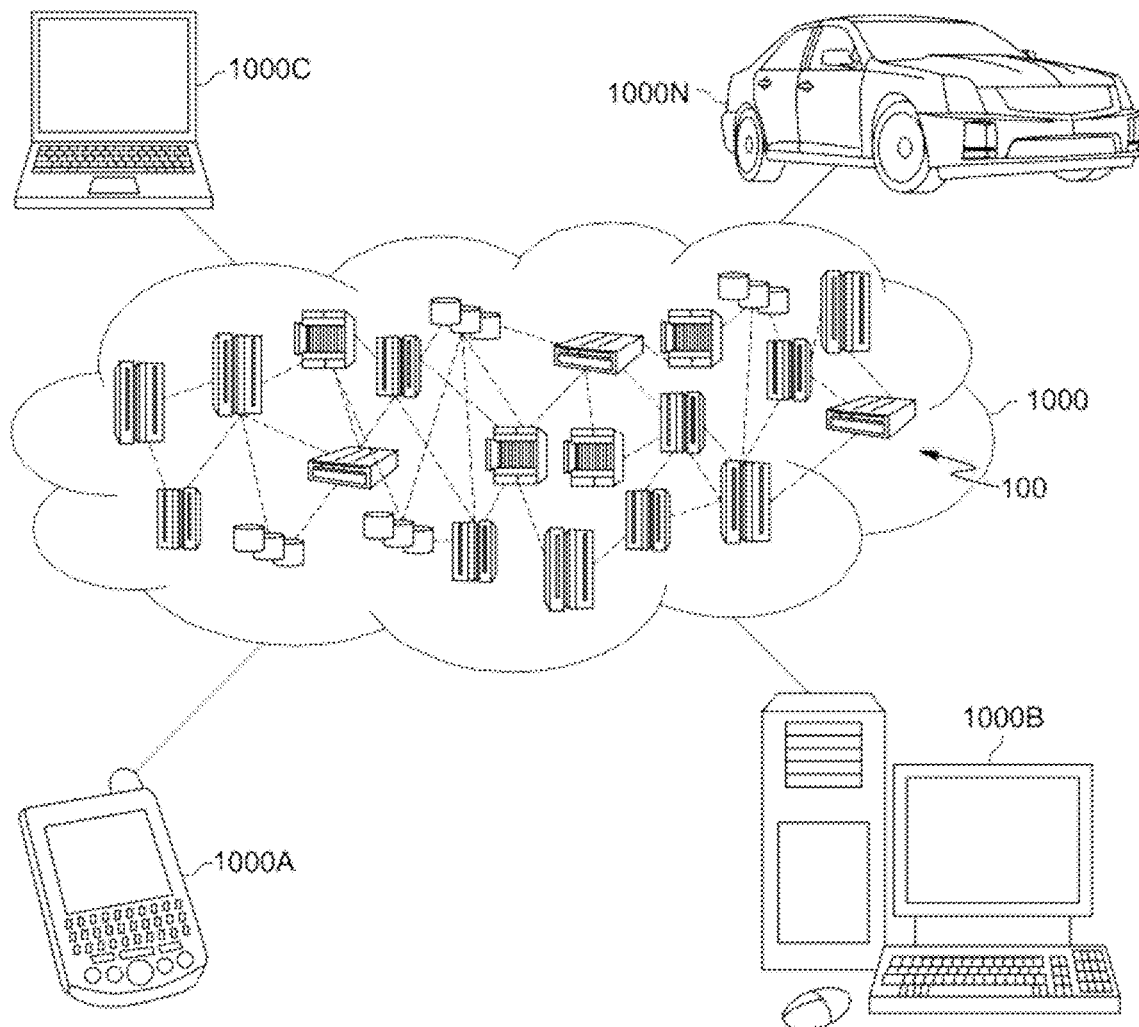
FIG. 9 is a block diagram of an illustrative cloud computing environment including the computer system depicted in FIG. 1, in accordance with an embodiment of the present disclosure.

Referring now to FIG. 9, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 9 are intended to be illustrative only and that computing nodes 100 and cloud computing environment 1000 can communicate with any type of computerized device over any type of network and/or network addressable connection (e.g., using a web browser).

Figure 10:
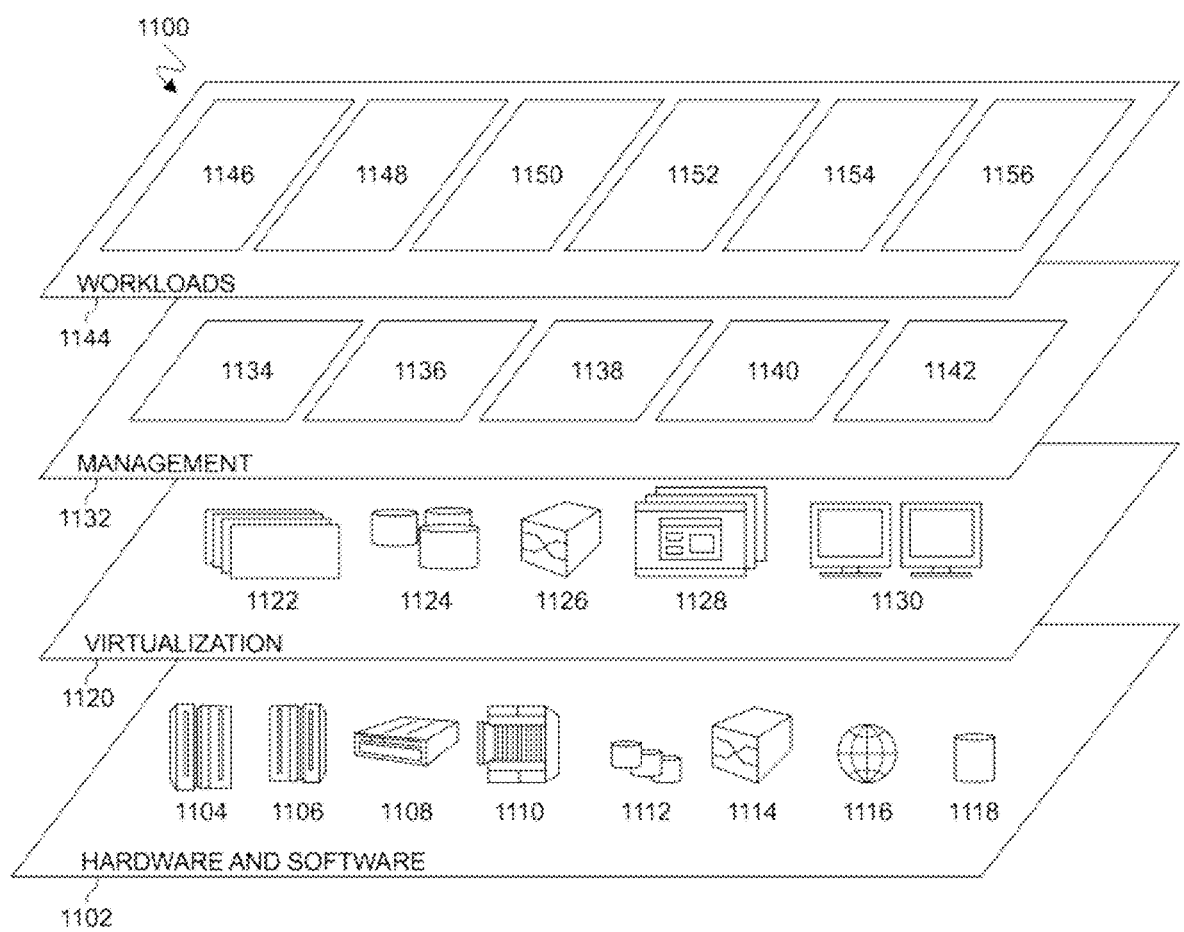
FIG. 10 is a block diagram of functional layers of the illustrative cloud computing environment of FIG. 9, in accordance with an embodiment of the present disclosure.

Referring now to FIG. 10, a set of functional abstraction layers 1100 provided by cloud computing environment 1000 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and automatic question generation 1156. A conversation program 110a, 110b provides a way to automatically generate suggestions for a user's next utterance in a chat conversation with a human agent, a chatbot or other cognitive conversation system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   training an intent-entity prediction model using a set of historical intent-entity sequences automatically generated from a corpus of historical chat transcripts, wherein each historical intent-entity sequence in the set of historical intent-entity sequences is organized in a historical utterance order corresponding to a first ordered vector of historical user utterances in the corpus of historical chat transcripts;
   extracting a second ordered vector of current user utterances from a current chat conversation between a user and a chatbot;
   generating a set of current intent-entity sequences from the extracted second ordered vector of current user utterances, wherein each current intent-entity sequence in the generated set of current intent-entity sequences is organized in a current utterance order corresponding to the extracted second ordered vector of current user utterances;
   determining, using the generated set of current intent-entity sequences on the trained intent-entity prediction model, a set of next predicted intents based on the determined set of next predicted intents including a corresponding set of highest confidence intents;
   generating a set of prediction inputs by appending respective next predicted intents from the determined set of next predicted intents to the generated set of current intent-entity sequences;
   predicting, using the generated set of prediction inputs on the trained intent-entity prediction model, a next intent-entity sequence based on the predicted next intent-entity sequence including an intent as a first token; and
   converting the predicted next intent-entity sequence into at least one suggested question for the user to ask the chatbot, wherein the at least one suggested question is displayed to the user in a current chat window, and wherein the at least one suggested question displayed in the current chat window is selectable by the user for input in the current chat conversation as a next question from the user.

2. The method of claim 1, further comprising:
   classifying, using a multi-class intent classifier, an intent in the extracted second ordered vector of current user utterances; and identifying at least one entity in the extracted second ordered vector of current user utterances.

3. The method of claim 1, further comprising:
separating an intent included in the predicted next intent-entity sequence from at least one entity corresponding to the intent;
mapping the separated intent to at least one question template;
selecting a question template from the at least one question template including an entity type that is relevant to the at least one entity corresponding to the separated intent; and
inserting the at least one entity into the selected question template to generate the at least one user question suggestion to return back to the user.

4. The method of claim 1, wherein the trained intent-entity prediction model further comprises a sequence to sequence model.

5. A computer system for automatically generated question suggestions, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
training an intent-entity prediction model using a set of historical intent-entity sequences automatically generated from a corpus of historical chat transcripts, wherein each historical intent-entity sequence in the set of historical intent-entity sequences is organized in a historical utterance order corresponding to a first ordered vector of historical user utterances in the corpus of historical chat transcripts;
extracting a second ordered vector of current user utterances from a current chat conversation between a user and a chatbot;
generating a set of current intent-entity sequences from the extracted second ordered vector of current user utterances, wherein each current intent-entity sequence in the generated set of current intent-entity sequences is organized in a current utterance order corresponding to the extracted second ordered vector of current user utterances;
determining, using the generated set of current intent-entity sequences on the trained intent-entity prediction model, a set of next predicted intents based on the determined set of next predicted intents including a corresponding set of highest confidence intents;
generating a set of prediction inputs by appending respective next predicted intents from the determined set of next predicted intents to the generated set of current intent-entity sequences;
predicting, using the generated set of prediction inputs on the trained intent-entity prediction model, a next intent-entity sequence based on the predicted next intent-entity sequence including an intent as a first token; and
converting the predicted next intent-entity sequence into at least one suggested question for the user to ask the chatbot, wherein the at least one suggested question is displayed to the user in a current chat window, and wherein the at least one suggested question displayed in the current chat window is selectable by the user for input in the current chat conversation as a next question from the user.

6. The computer system of claim 5, further comprising:
classifying, using a multi-class intent classifier, an intent in the extracted second ordered vector of current user utterances; and
identifying at least one entity in the extracted second ordered vector of current user utterances.

7. The computer system of claim 5, further comprising:
separating an intent included in the predicted next intent-entity sequence from at least one entity corresponding to the intent;
mapping the separated intent to at least one question template;
selecting a question template from the at least one question template including an entity type that is relevant to the at least one entity corresponding to the separated intent; and
inserting the at least one entity into the selected question template to generate the at least one user question suggestion to return back to the user.

8. The computer system of claim 5, wherein the trained intent-entity prediction model further comprises a sequence to sequence model.

9. A computer program product for automatically generated question suggestions, comprising:
one or more computer-readable storage media and program instructions collectively stored on the one or more computer-readable storage media, the program instructions executable by a processor to cause the processor to perform a method comprising:
training an intent-entity prediction model using a set of historical intent-entity sequences automatically generated from a corpus of historical chat transcripts, wherein each historical intent-entity sequence in the set of historical intent-entity sequences is organized in a historical utterance order corresponding to a first ordered vector of historical user utterances in the corpus of historical chat transcripts;
extracting a second ordered vector of current user utterances from a current chat conversation between a user and a chatbot;
generating a set of current intent-entity sequences from the extracted second ordered vector of current user utterances, wherein each current intent-entity sequence in the generated set of current intent-entity sequences is organized in a current utterance order corresponding to the extracted second ordered vector of current user utterances;
determining, using the generated set of current intent-entity sequences on the trained intent-entity prediction model, a set of next predicted intents based on the determined set of next predicted intents including a corresponding set of highest confidence intents;
generating a set of prediction inputs by appending respective next predicted intents from the determined set of next predicted intents to the generated set of current intent-entity sequences;
predicting, using the generated set of prediction inputs on the trained intent-entity prediction model, a next intent-entity sequence based on the predicted next intent-entity sequence including an intent as a first token; and
converting the predicted next intent-entity sequence into at least one suggested question for the user to ask the chatbot, wherein the at least one suggested question is displayed to the user in a current chat window, and wherein the at least one suggested question displayed in the current chat window is selectable by the user for input in the current chat conversation as a next question from the user.

10. The computer program product of claim 9, further comprising:
   classifying, using a multi-class intent classifier, an intent in the extracted second ordered vector of current user utterances; and
   identifying at least one entity in the extracted second ordered vector of current user utterances.

11. The computer program product of claim 9, further comprising:
   separating an intent included in the predicted next intent-entity sequence from at least one entity corresponding to the intent;
   mapping the separated intent to at least one question template;
   selecting a question template from the at least one question template including an entity type that is relevant to the at least one entity corresponding to the separated intent; and
   inserting the at least one entity into the selected question template to generate the at least one user question suggestion to return back to the user.

12. The computer program product of claim 9, wherein the trained intent-entity prediction model further comprises a sequence to sequence model.

* * * * *